3,053,811
COPOLYMER COMPRISING THE REACTION PRODUCT OF: 6-AMINOCAPROIC ACID OR CAPROLACTAM; AN ALIPHATIC PRIMARY DIAMINE; AND UREA
George E. Ham, Kansas City, Mo., assignor, by mesne assignments, to Monsanto Chemical Company, a corporation of Delaware
No Drawing. Filed Jan. 28, 1959, Ser. No. 789,497
6 Claims. (Cl. 260—77.5)

This invention relates to new synthetic polymeric materials and to a process for producing same. More particularly, the invention is concerned with the manufacture of new copolymers formed from an organic diamine, urea, and 6-aminocaproic acid or a 6-aminocaproic acid forming derivative, such as caprolactam.

Linear condensation polyureas are known polymeric materials and have been prepared from organic diamines and various other reactants. Unfortunately, as a class the polymers have not shown outstanding promise in regard to being converted into fibers since they suffer from the disadvantage of relatively poor thermal stability. Furthermore, polymeric 6-aminocaproic acid is a known substance that has found considerable use as a textile fiber and as a powder from which molded articles can be produced. One drawback to its extended use, particularly in the textile field, is that polymeric 6-aminocaproic acid has a relatively low melting point that is not desirable for certain end uses.

It is an object of this invention to provide new and useful copolymers. It is another object of this invention to provide novel copolymers from which shaped articles, such as filaments, that have a relatively high thermal stability and a relatively high melting point can be produced. It is still another object of this invention to provide a method of producing new and useful copolymers. It is a further object of this invention to provide a method of producing new and useful copolymers and shaping same into threads, filaments, and the like of improved heat stability and melting point and suitable for use in normal textile processes. It is still a further object to provide a composition of matter from which said new copolymers may be produced. Other objects and advantages of the instant invention will appear and will be apparent from the description thereof hereinafter.

In accordance with one preferred procedure of the present invention the new copolymers herein are produced by forming a mixture of suitable amounts of ingredients comprising: (a) 6-aminocaproic acid or 6-aminocaproic acid forming derivative, (b) an organic diamine, and (c) urea, and heating said mixture at an elevated temperature with evolution of ammonia and water until a viscous, molten, highly polymeric mass is obtained. It is preferred to continue the reaction until the polymeric mass has a molecular weight within the fiber-forming range. Fibers produced from the desired resulting polymer are cold-drawable. The reaction normally is carried out at atmospheric pressure, although the reaction may be carried out at pressures above or below atmospheric pressure. In general the process employed to prepare the copolymer herein is a polycondensation reaction that is easily controlled and requires no special apparatus. However, in order to obtain a light colored product, it is necessary to conduct the reaction in substantial absence of oxygen. That is to say, the reaction should be carried out in an inert atmosphere, for example, in the presence of nitrogen, argon, helium, and the like.

While the invention includes the production of polymers of relatively low molecular weight that may be useful in the manufacturing of coating compositions, lacquers, and the like, it is primarily concerned with polymers that have film- and fiber-forming properties. When a molecular weight of at least 5,000 is attained, filaments made from the polymers usually exhibit cold-drawing properties, with consequent increase in filament strength. For better filaments the polymerization is carried to the extent that the resultant polymer has a molecular weight of at least 15,000, the molecular weight being determined by measuring the viscosity of dilute polymer solutions in a manner well-known in the art.

The polymeric products obtained by the process of the present invention have properties that make them suitable for such applications as molding, casting, and filament formation in the plastics field by conventional techniques. Unexpectedly it was found that the fibers formed from the polymeric products have melting points that render them eminently suitable for use in woven, nonwoven, and knitted fabrics and the like textile products that may be subjected to ironing and other operations employing the application of heat. Filaments may be produced by melt spinning, i.e., by extruding the melt of the polymer through suitable orifices and into a cooling atmosphere. Filaments may also be produced by conventional wet or dry spinning methods from solutions of the polymers. If the polymer is of sufficiently high molecular weight, the filaments so produced may be drawn at comparatively low temperatures to fine filaments having good tenacity and elasticity.

A variety of organic diamines may be employed in the practice of the invention. It has been found that saturated aliphatic primary and secondary diamines in which the reactive amino groups are separated by a linear chain of between 2 and 20 carbon atoms are suitable monomeric substances. It will be appreciated that the primary-secondary amines of the just-defined class of organic diamines also may be used. Among such organic diamines are tetramethylene diamine, pentamethylene diamine, hexamethylene diamine, heptamethylene diamine, octamethylene diamine, etc.

The proportions of the quantities of 6-aminocaproic acid or its forming derivatives, organic diamine, and urea may vary without departing from the scope of the invention. Depending upon the specific organic diamine employed and the type of polymeric product desired, the mol percent ratio of combined caprolactam or its forming derivatives based on the final product may range from about 10 to 50. On the other hand, the mol percent ratio of combined organic diamine and the combined urea based on the final product may range from about 20 to 60.

The copolymers are conveniently prepared by mass polymerization, although they may be prepared in a liquid medium that is inert to the reaction. A suitable catalyst or a combination of two or more catalysts, of course, may be used if desired to increase the rapidity of the reaction. In carrying out the reaction the temperature employed may be varied in the order of 100° C. to 300° C. and higher. For better results it is preferred to operate in the range of 200° C. to 300° C. As indicated above, the heating is done generally under an inert atmosphere since at these elevated temperatures the condensing mass is susceptible to oxidation by air or even traces of oxygen. Oxidation causes darkening and degradation of the polymer; and accordingly, it is important to exclude oxygen from the reaction vessel when color in the final product will be detrimental, such as in the preparation of polymers to be used to make textile fibers. Obviously where color is not a factor, nitrogen or other inert gas need not be employed. The exclusion of oxygen may be accomplished in one manner by sweeping the air out of the reaction vessel with the inert gas prior to the initiation of the reaction and maintaining the oxygen-free atmosphere by passing a continuous stream of the inert gas through the reaction vessel during polycondensation. The stream of inert gas also will assist in the removal of undesirable volatile by-products, such as ammonia and water, as well as unreacted monomers. In many instances, it is desirable to subject the hot reaction mass to reduced pressure during at least a portion (usually the later stages) of the reaction. By so doing, the removal of the aforesaid undesirable volatile by-products and unreacted monomers is facilitated.

It is understood that in producing the copolymer the polycondensation reaction may be conducted in the presence of molecular weight regulators that act as chain terminators and prevent the formation of large molecular weight increments. Other additives that modify the polymer such as delusterants, plasticizers, pigments, colorants, oxidation inhibitors, and the like may be incorporated in the polymer, if desired.

In order to more clearly understand the process of the present invention, the following examples are given that are intended to be illustrative and not limitative. Unless otherwise indicated all parts and percentages are given on a weight basis.

*Example I*

A mixture of 2.0 parts of caprolactam, 8.4 parts of hexamethylene diamine (72% aqueous solution), and 3.1 parts of urea was heated at 290° C. for two hours. Ammonia and water rapidly evolved until the melt assumed a high viscosity and solidified. The polymer so obtained possessed a sticking temperature of 300° C. and a melting point of greater than 310° C. Cold-drawable fibers were pulled from the melt.

*Example II*

A mixture of 4.0 parts of caprolactam, 5.5 parts of hexamethylene diamine (72% aqueous solution), and 2.1 parts of urea was heated under nitrogen for thirty minutes at 222° C. whereupon solidification of the reaction mixture to a white mass occurred. Continued heating at 280° C. remelted the solid material and induced a gradual increase in the viscosity thereof. Evolution of ammonia and water occurred throughout the polycondensation reaction. After maintaining the mass at 280° C., the resulting polymer was light in color and had a viscosity of 400 poises. Cold-drawable fibers were produced from the resulting polymer. The fibers had good strength and a melting point of 215° C.

*Example III*

A mixture of 2.0 parts of caprolactam, 5.5 parts of hexamethylene diamine (72% aqueous solution), and 2.1 parts of urea was heated under nitrogen for three hours at 222° C. and a solid polymeric material was formed. Continued heating at 290° C. remelted the polymeric material and rapid partial solidification thereof occurred. A fiber-forming, white polymer having a sticking point of 300° C. and a melting point of 304° C. was obtained.

*Example IV*

A mixture of 6.0 parts of caprolactam, 2.8 parts of hexamethylene diamine (72% aqueous solution), and 1.0 part of urea was heated for five hours at 222° C. while nitrogen was bubbled through the mixture during reaction. A light yellow product having a viscosity of 250 poises and a melting point of 163° C. was obtained. The polymer was processed into fibers that were cold-drawable.

When the above procedures are repeated with other defined organic diamines and in the amounts set forth hereinabove, similar excellent results are obtained. For example, when tetramethylene diamine, pentamethylene diamine, etc., are employed instead of hexamethylene diamine, useful polymers are likewise obtained.

As many variations within the scope of this invention will occur to those skilled in the art, it is to be understood that the invention is not limited to the specific embodiments thereof except as set forth in the appended claims.

What is claimed is:

1. A fusible copolymer from which cold-drawable fibers can be formed comprising the reaction product of heating together the mixture of (a) a compound selected from the group consisting of 6-aminocaproic acid and caprolactam; (b) an organic saturated aliphatic primary diamine in which the reactive amino groups are separated by a linear carbon chain of between 2 and 20 carbon atoms; and (c) urea; said compound (a) employed in a mol percent ratio of about 10 to 50 and said compounds (b) and (c) employed each in a mol percent ratio of about 20 to 60, the mol percent ratio of each component being such that the total of the three components will equal 100 percent.

2. A fiber-forming copolymer from which cold-drawable fibers can be formed comprising the reaction product of heating together the mixture of (a) a compound selected from the group consisting of 6-aminocaproic acid and caprolactam; (b) hexamethylene diamine; and (c) urea; said compound (a) employed in a mol percent ratio of about 10 to 50 and said compounds (b) and (c) employed each in a mol percent ratio of about 20 to 60.

3. A method of producing a fiber-forming copolymer comprising forming a mixture of ingredients comprising (a) a compound selected from the group consisting of 6-aminocaproic acid and caprolactam; (b) an organic saturated aliphatic primary diamine in which the reactive amino groups are separated by a linear carbon chain of between 2 and 20 carbon atoms; and (c) urea; said compound (a) being employed in a mol percent ratio of about 10 to 50 and said compounds (b) and (c) being employed each in a mol percent ratio of about 10 to 50, the mol percent ratio of each component being such that the total of the three components will be 100 percent; and heating the resulting mixture at an elevated temperature until a viscous molten mass is obtained from which cold-drawable fibers can be formed.

4. A method of producing a fiber-forming copolymer comprising forming a mixture of ingredients comprising (a) a compound selected from the group consisting of 6-aminocaproic acid and caprolactam; (b) hexamethylene diamine; and (c) urea; said compound (a) being employed in a mol percent ratio of about 10 to 50 and said compounds (b) and (c) being employed each in a mol percent ratio of about 20 to 60, the mol percent ratio of each component being such that the total of the three components will be 100 percent; and heating the resulting mixture at an elevated temperature until a viscous molten mass is obtained from which cold-drawable fibers can be formed.

5. A method of producing a fiber-forming copolymer comprising forming a mixture of ingredients comprising (a) caprolactam; (b) an organic saturated aliphatic primary diamine in which the reactive amino groups are separated by a linear carbon chain of between 2 and 20 carbon atoms; and (c) urea; said caprolactam being present in a mol percent ratio of about 10 to 50; said diamine and said urea being present in a mol percent ratio of about 20 to 60, the mol percent ratio of each component being such that the total of the three components will be 100 percent; and heating the resulting mixture at an elevated temperature between 100° C. and 300° C. until a viscous molten mass is obtained from which cold-drawable fibers can be formed.

6. A method of producing a fiber-forming copolymer comprising forming a mixture of ingredients comprising (a) caprolactam; (b) hexamethylene diamine; and (c) urea; said caprolactam being present in a mol percent ratio of about 10 to 50; said diamine and said urea being present in a mol percent ratio of about 20 to 60, the mol percent ratio of each component being such that the total of the three components will be 100 percent; and heating the resulting mixture at an elevated temperature between 100° C. and 300° C. until a viscous molten mass is obtained from which cold-drawable fibers can be formed.

References Cited in the file of this patent

UNITED STATES PATENTS 2,720,508    Melamed ---------------- Oct. 11, 1955

FOREIGN PATENTS 457,909    Italy -------------------- May 5, 1943